United States Patent
Watanabe et al.

(10) Patent No.: US 8,815,760 B2
(45) Date of Patent: *Aug. 26, 2014

(54) TRANSPARENT ZIRCONIA SINTERED BODY, METHOD FOR PRODUCING SAME, AND USE OF SAME

(75) Inventors: Masahiro Watanabe, Toyama (JP); Satoshi Kondoh, Toyama (JP); Koji Tsukuma, Kanagawa (JP)

(73) Assignee: Tosoh Corporation, Yamaguchi (JP)

( * ) Notice: Subject to any disclaimer, the term of this patent is extended or adjusted under 35 U.S.C. 154(b) by 5 days.

This patent is subject to a terminal disclaimer.

(21) Appl. No.: 13/380,190

(22) PCT Filed: Jul. 15, 2010

(86) PCT No.: PCT/JP2010/062005
§ 371 (c)(1),
(2), (4) Date: Dec. 22, 2011

(87) PCT Pub. No.: WO2011/016325
PCT Pub. Date: Feb. 10, 2011

(65) Prior Publication Data
US 2012/0094823 A1    Apr. 19, 2012

(30) Foreign Application Priority Data
Aug. 7, 2009 (JP) ................. 2009-184139

(51) Int. Cl.
*C04B 35/486* (2006.01)

(52) U.S. Cl.
CPC .................................. *C04B 35/486* (2013.01)
USPC .............................. 501/103; 501/104; 106/35

(58) Field of Classification Search
CPC .................................................. C04B 35/486
USPC ........................... 501/103, 104; 106/35
See application file for complete search history.

(56) References Cited

U.S. PATENT DOCUMENTS

| 4,758,541 A | 7/1988 | Tsukuma |
| 4,915,625 A | 4/1990 | Tsukuma et al. |

(Continued)

FOREIGN PATENT DOCUMENTS

| CN | 1051713 | 5/1991 |
| CN | 1526683 | 9/2004 |

(Continued)

OTHER PUBLICATIONS

Umberto Anselmi—Tamburini et al., "Transparent Nanometric Cubic and Tetragonal Zirconia obtained by High-Pressure Pulsed Electric Current Sintering", Advanced Functional Materials, vol. 17, XP002692323, Jan. 1, 2007, pp. 3267-3273.

(Continued)

*Primary Examiner* — Karl Group
(74) *Attorney, Agent, or Firm* — Greenblum & Bernstein, P.L.C.

(57) ABSTRACT

The subject of the present invention relates to obtaining a zirconia sintered body having excellent in both properties of a translucency and a mechanical strength. The present invention relates to obtaining a high-strength zirconia sintered body having a translucency of an in-line transmission of 50% or more at a sample thickness of 1 mm for visible light at a wavelength of 600 nm and an average flexural strength of 300 MPa or more by subjecting a zirconia primary sintered body having an average grain size of 1 μm or less and a relative density of 92% or more and the crystal phase composed of cubic crystals only to HIP treatment at a temperature of 1,250° C. to 1,600° C. and a pressure of at least 50 MPa. The primary sintered body is obtained by maintaining a molded body of a zirconia powder containing 7 mol % to 30 mol % of yttria at 1,100° C. to 1,300° C. for at least 5 hrs or by heating the molded body at a high rate of temperature rise of 500° C./hr or more.

12 Claims, 2 Drawing Sheets

(56) References Cited

U.S. PATENT DOCUMENTS

| | | | |
|---|---|---|---|
| 7,291,574 B2* | 11/2007 | Tanaka et al. | 501/105 |
| 7,538,055 B2* | 5/2009 | Tsukuma et al. | 501/103 |
| 8,309,015 B2* | 11/2012 | Rolf et al. | 264/681 |
| 2004/0192535 A1 | 9/2004 | Tanaka et al. | |
| 2007/0197368 A1* | 8/2007 | Tsukuma et al. | 501/103 |
| 2010/0003630 A1* | 1/2010 | Yamashita et al. | 433/8 |
| 2010/0041542 A1* | 2/2010 | Rolf et al. | 501/104 |
| 2010/0272997 A1* | 10/2010 | Ying et al. | 428/402 |
| 2012/0058883 A1 | 3/2012 | Yamashita et al. | |

FOREIGN PATENT DOCUMENTS

| | | | |
|---|---|---|---|
| DE | 102009030951 | | 1/2010 |
| EP | 0206780 | | 12/1986 |
| EP | 2 045 222 | | 4/2009 |
| EP | 2439182 | | 4/2012 |
| JP | 61044763 | * | 3/1986 |
| JP | 62-91467 | * | 4/1987 |
| JP | 2007-246384 | | 9/2007 |
| JP | 2007246384 | * | 9/2007 |
| JP | 2008-50247 | | 3/2008 |
| JP | 2008-214168 | | 9/2008 |
| JP | 2008-222450 | | 9/2008 |
| JP | 2010-47460 | | 3/2010 |
| JP | 2011-11970 | | 1/2011 |
| JP | 2011-102227 | | 5/2011 |
| WO | 2008/083282 | | 7/2008 |

OTHER PUBLICATIONS

Duran P et al., "Preparation, Sintering, and Properties of Translucent ER2O3-Doped Tetragonal Zirconia", Journal of the American Ceramic Society, Blackwell Publishing, Malden, MA, US, vol. 72, No. 11, XP000103093, Nov. 1, 1989, pp. 2088-2093.
Search report from E.P.O., mail date is Mar. 7, 2013.
"International Search Report (ISR).", Application No. PCT/JP2010/062005, Date: Nov. 2, 2010, pp. 1-2.
Koji Tsukuma, "Zirconia Ceramics 8", Tokyo Research Center, 1986, pp. 11-20.
China Office action, dated Mar. 11, 2013 along with an english translation thereof.
Peuchert et al, "Transparent cubic-$ZrO_2$ ceramics for applications as optical lenses," Journal of the European Ceramics Society 29, 2009, pp. 283-291.
U.S. Appl. No. 13/320,441 to Isao Yamashita et al, filed Nov. 14, 2011.
Tsukuma, Koji, "Transparent titania-yttria-zirconia ceramics," Journal of Materials Science Letters, vol. 5, No. 11, pp. 1143-1144 (1986).
Shigeyuki Somiya et al., Jiruconia Seramikkusu, 8, 1986, pp. 11-20.
Mendelson. "Average Grain Size in Polycrystalline Ceramics", Journal of The American Ceramic Society, vol. 52, No. 8, 1969, pp. 443-446.
China Office Action dated Oct. 30, 2013 in Chinese application No. 201080035072.X, and English translation thereof.
Japan Office Action, dated Dec. 3, 2013 from Japanese Patent Application No. 2010-163731 with an English translation thereof.
Chinese office action in 201080035072.X, dated May 13, 2014 along with an English translation thereof.
Japan Office action, dated Mar. 18, 2014 along with an english translation thereof.

* cited by examiner

20kV ×35,000 0.5μm 704051

30kV ×5,000 5μm 070330

TRANSPARENT ZIRCONIA SINTERED BODY, METHOD FOR PRODUCING SAME, AND USE OF SAME

TECHNICAL FIELD

The present invention relates to a zirconia sintered body which is transparent and has an excellent mechanical strength, which can be used in decorative members, exterior components of electronic devices and aesthetic dental materials.

BACKGROUND ART

Zirconia single crystals, being glossy and having transparency, are used in jewelry goods, etc. as cubic zirconia. However, single crystals suffer from difficulty in processing into desired shapes and have problems, such as limited size that can be obtained.

Under such circumstances, attempts have been made to develop polycrystalline bodies having transparency comparable to single crystals by molding powders into desired shapes, followed by sintering.

For example, Patent Document 1 reports a zirconia sintered body produced by HIP treatment and having high transparency substantially comparable to single crystals. However, the sintered body disclosed has high translucency but is not suitable for use in applications where strength is particularly required because of its large grain size of about 50 µm.

Also, Patent Document 2 reports a highly transparent zirconia sintered body containing titania. However, the added titania promotes the growth of the grains to the grain size as large as about 100 µm to about 200 µm, which causes insufficient mechanical strength of the sintered body disclosed.

That is, since the conventional transparent zirconia sintered bodies have large grain sizes of 50 µm or more, their mechanical strengths are low. For example, a transparent titania-containing zirconia sintered body having a grain size of 200 µm has a flexural strength as low as 210 MPa (Non-Patent Document 1).

High-strength zirconia sintered bodies have insufficient translucency. For example, a zirconia sintered body having an average grain size of 10 µm or less has an in-line transmission of less than 20% in the case of a sample thickness of 0.5 mm (Patent Document 3), a zirconia sintered body has a total forward transmission of less than 50% in the case of a sample thickness of 0.5 mm (Patent Document 4), and a zirconia sintered body has a total forward transmission of less than 50% in the case of a sample thickness of 1 mm (Patent Document 5).

As just described, transparent zirconia sintered bodies which satisfy both high translucency and high mechanical strength have not yet been obtained.

PRIOR ART DOCUMENTS

Patent Documents

Patent Document 1: JP-A-2007-246384
Patent Document 2: JP-A-62-91467
Patent Document 3: JP-A-2008-214168
Patent Document 4: JP-A-2008-50247
Patent Document 5: JP-A-2008-222450

Non-Patent Document

Non-Patent Document: Zirconia Ceramics 8, edited by Somiya Shigeyuki and Yoshimura Masahiro, Uchida Rokakuho Publishing Co., Ltd., pp. 19, 1986

SUMMARY OF THE INVENTION

Problems to be Solved by the Invention

An object of the present invention is to provide a zirconia sintered body which satisfies both transparency and mechanical strength, a method for producing the zirconia sintered body, and use of the zirconia sintered body.

Means for Solving the Problems

The inventors have earnestly conducted research to improve the translucency and mechanical strength of zirconia sintered bodies, and as a result, have found that a zirconia sintered body having a sintered grain size of 10 µm or less can satisfy both mechanical strength and translucency. The present invention has been accomplished based on this finding.

That is, features of the present invention reside in the following (1) to (13).

(1) A zirconia sintered body characterized by having an average grain size of 10 µm or less and an in-line transmission of 50% or more at a sample thickness of 1 mm for visible light at a measured wavelength of 600 nm.

(2) The zirconia sintered body according to (1) above, wherein the average grain size is preferably 8 µm or less.

(3) The zirconia sintered body according to (1) or (2) above, wherein the average grain size is preferably 5 µm or less.

(4) The zirconia sintered body according to any one of (1) to (3) above, wherein the in-line transmission is preferably 55% or more at a sample thickness of 1 mm for visible light at a measured wavelength of 600 nm.

(5) The zirconia sintered body according to any one of (1) to (4) above, wherein the in-line transmission is preferably 60% or more at a sample thickness of 1 mm for visible light at a measured wavelength of 600 nm.

(6) The zirconia sintered body according to any one of (1) to (5) above, wherein yttria is preferably contained in an amount of 7 mol % to 30 mol %.

(7) The zirconia sintered body according to any one of (1) to (6) above, wherein an average flexural strength is preferably 300 MPa or more.

(8) The zirconia sintered body according to any one of (1) to (7) above, wherein an average flexural strength is preferably 350 MPa or more.

(9) The zirconia sintered body according to any one of (1) to (8) above, wherein crystal phase is preferably a cubic fluorite structure.

(10) A method for producing a zirconia sintered body, comprising molding a zirconia powder, sintering the zirconia molded body and subjecting the resultant primary sintered body to hot isostatic pressing (HIP) treatment, wherein the primary sintered body served for the HIP treatment has an average grain size of 1 µm or less and a relative density of 92% or more and its crystal phase is composed of cubic crystals only.

(11) The method for producing a zirconia sintered body according to (10) above, wherein the primary sintered body is preferably maintained at a temperature of 1,200° C. to 1,300° C. for at least 5 hrs.

(12) The method for producing a zirconia sintered body according to (10) above, wherein the primary sintered body is preferably prepared by sintering the molded body at a temperature rise rate of 500° C./hr or more and at a sintering temperature of from 1,350 to 1,500° C. without maintaining the molded body at the sintering temperature.

(13) The method for producing a zirconia sintered body according to any one of (10) to (12) above, wherein the HIP treatment is preferably performed at a temperature of 1,250° C. to less than 1,600° C. and a pressure of at least 50 MPa.

Effects of the Invention

The zirconia sintered body of the present invention has an average grain size of 10 μm or less and high translucency to thereby have high mechanical strength, simultaneously.

MODES FOR CARRYING OUT THE INVENTION

Figure 1:
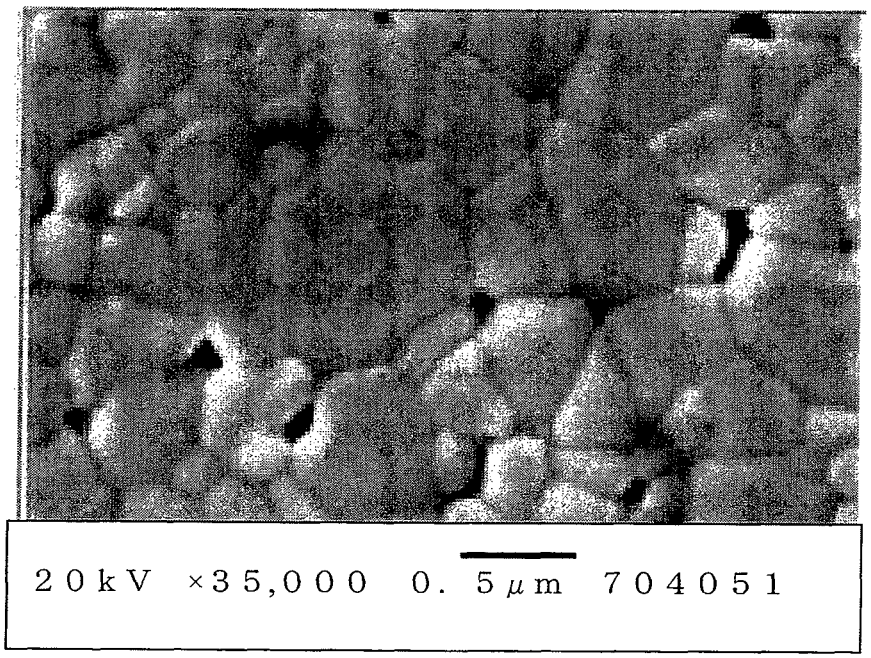
FIG. 1 shows a texture of a primary sintered body (Example 1) (scale bar=0.5 μm).

The zirconia sintered body of the present invention will now be described in detail.

The zirconia sintered body of the present invention has an average grain size of 10 μm or less, preferably 8 μm or less, more preferably 5 μm or less, even more preferably 4 μm or less, and particularly preferably 1 μm or less. The average grain size of 10 μm or less can ensure high mechanical strength, particularly high flexural strength.

The average grain size in the present invention can be determined by SEM observation of the sintered body, based on the method described in the Examples below.

The zirconia sintered body of the present invention has an in-line transmission of 50% or more, preferably 55% or more, more preferably 60% or more, even more preferably 65% or more, and particularly preferably 70% or more, at a sample thickness of 1 mm for visible light at a measured wavelength of 600 nm. An in-line transmission of 50% or more had not hitherto been achieved by high-strength sintered bodies having a grain size of 10 μm or less.

A sintered body having an in-line transmission of less than 50% has insufficient transparency and has translucency insufficient for use in applications, such as decorative members. The theoretical total forward transmission of transparent cubic zirconia is 75%. Accordingly, the zirconia sintered body according to the present invention is a sintered body having the transmission comparable to the theoretical value.

The zirconia sintered body of the present invention preferably contains yttria as a stabilizer in an amount of 7 mol % to 30 mol %, and more preferably 8 mol % to 15 mol %. The crystal structure of the zirconia sintered body is stabilized due to the presence of the yttria. Also, the crystal phase of the zirconia sintered body can be composed of cubic crystals (fluorite structure) only by limiting the yttria content to the range defined above. Meanwhile, if the yttria content is less than 7 mol %, the cubic crystals tend to coexist with tetragonal crystals, resulting in translucency deterioration.

The zirconia sintered body of the present invention may further include small amounts of other stabilizers, for example, lanthanide rare earth oxides, Ca and Mg, without causing a change in cubic phase and deterioration in translucency.

The crystal phase of the zirconia sintered body according to the present invention is preferably a cubic fluorite structure. Since cubic crystals have no optical anisotropy, when each crystal in polycrystalline body contained in the zirconia sintered body is the cubic crystal, particularly high transparency can be obtained.

The zirconia sintered body of the present invention preferably has an average flexural strength of 300 MPa or more, more preferably 350 MPa or more, and even more preferably 400 MPa or more. A sintered body having an average flexural strength of less than 300 MPa tends to be brittle due to its insufficient mechanical properties, which limits its use.

Hereinafter, a description will be given concerning the method for producing a zirconia sintered body according to the present invention.

No particular restriction is imposed on the method for producing a zirconia sintered body according to the present invention but the following preferred embodiments may be applied to the method of the present invention.

The zirconia sintered body of the present invention can be produced by molding a zirconia powder, sintering the zirconia molded body, and subjecting the resultant primary sintered body to hot isostatic pressing (HIP) treatment (hereinafter, referred to as "HIP sintering method") wherein the primary sintered body has an average grain size of 1 μm or less and a relative density of 92% or more and the crystal phase is composed of cubic crystals only.

The primary sintered body used in the method of the present invention has an average grain size of 1.0 μm or less, more preferably 0.1 μm to 0.9 μm, and even more preferably 0.3 μm to 0.7 μm. If the average grain size exceeds 1 μm, transfer of the material is impeded during HIP treatment, making it difficult to obtain high translucency after HIP treatment. Meanwhile, if the average grain size is less than 0.1 μm, it is difficult to obtain a relative density of 92% or more.

The relative density of the primary sintered body is 92% or more, and preferably 93% or more. If the relative density is less than 92%, a pressure-mediating gas may penetrate the sintered body during HIP treatment, making it impossible to carry out the treatment further. An actual primary sintered body having an average grain size of 1 μm or less is thought to have a relative density of 98%.

As the stabilizer contained in the primary sintered body, yttria is preferably contained in an amount of from 7 mol % to 30 mol %, and more preferably from 8 mol % to 15 mol %. Within this range, the crystal phase of the primary sintered body can be composed of cubic crystals (fluorite structure) only.

The primary sintered body served for HIP sintering method, which is used for producing conventional transparent zirconia sintered bodies, has an average grain size exceeding 1 μm if the primary sintering temperature is higher than 1,300° C. Even if the primary sintered body is sintered at a temperature of 1,300° C. or less, when the yttria content is less than 7 mol %, the crystal phase is not composed of cubic crystals only.

In order to satisfy the above physical properties, the sintering conditions for obtaining the primary sintered body can be applied to the following conditions.

According to a first sintering method, sintering is performed while maintaining the temperature at 1,200° C. to 1,300° C. for at least 5 hrs (hereinafter, referred to as a "low-temperature sintering method").

The sintering temperature for the low-temperature sintering method is from 1,200° C. to 1,300° C., and preferably 1,230° C. to 1,280° C. If the temperature is lower than 1,200° C., it is difficult to obtain a primary sintered body having a relative density of 92% or more even after long-term retention. Meanwhile, if it exceeds 1,300° C., grains of a primary sintered body grow to an average grain size of 1 μm or more. It is more preferred to limit the sintering temperature to 1,280° C. or less in order to inhibit growth of the grains.

It is not necessary to maintain the sintering temperature at 1,200° C. to 1,300° C. For example, it may also be possible to slowly raise or lower the sintering temperature.

The time for the low-temperature sintering method is maintained for at least 5 hrs, preferably at least 8 hrs, more preferably at least 10 hrs, and even more preferably at least 20 hrs. If the sintering time is maintained for less than 5 hrs, the relative density of the primary sintered body is reduced to less than 92%.

Densification is difficult to achieve in the temperature range of 1,200° C. to 1,300° C. This temperature range cannot be generally adopted as a condition for sintering of a primary sintered body. However, when a primary sintered body is maintained in the corresponding temperature range for a long period of time, it is possible to achieve densification of the primary sintered body while inhibiting growth of the grains.

According to another preferred primary sintering method, the sintering is performed by heating at a rate of 500° C./hr or more at a sintering temperature of from 1,350° C. to 1,500° C. without maintaining the sintering temperature constant (hereinafter, referred to as a "high-speed sintering method").

In the high-speed sintering method, the temperature rise rate is at least 500° C./hr, and preferably at least 1,000° C./hr. If the temperature rise rate is less than 500° C./hr, it takes a long time to reach the sintering temperature, and therefore, the grains of the primary sintered body tends to grow.

The sintering temperature for the high-speed sintering method is preferably from 1,350° C. to 1,500° C., and more preferably 1,400° C. to 1,500° C. A sintering temperature lower than 1,350° C. makes it difficult for the primary sintered body to have a relative density of 92% or more. Meanwhile, a sintering temperature higher than 1,500° C. makes it difficult for the primary sintered body to have an average grain size of 1 μm or less.

Furthermore, a fast temperature drop is preferred. Alternatively, as usual, the primary sintered body may be allowed to cool by stopping the heating immediately after reaching the sintering temperature.

The zirconia powder that can be used in the present invention is particularly unrestricted as long as a primary sintered body having an average grain size of 1 μm or less and a relative density of 92% or more and composed of cubic crystals only can be obtained therefrom. It is preferred to use an easy-to-sinter powder. Preferably, the powder has a specific surface area of 5 m²/g to 20 m²/g and a crystallite diameter of 10 nm to 70 nm, as properties.

Preferably, the zirconia powder used in the present invention contains as a stabilizer. The yttria is preferably contained as a stabilizer in an amount of 7 mol % to 30 mol %, and more preferably 8 mol % to 15 mol %.

The zirconia powder may be commercially available or be directly produced by neutralization or hydrolysis. A highly sinterable powder produced by hydrolysis is particularly preferred.

The molding method of zirconia powder is unrestricted as long as a molded body having a shape suitable to serve for primary sintering can be obtained, and examples thereof include molding methods such as, press molding, cold isostatic press molding, cast molding, extrusion molding and injection molding, which are generally used for molding of ceramics.

The primary sintering can be performed under atmospheric pressure in an atmosphere such as, air, oxygen or vacuo. It is preferred to perform the sintering in air as the most convenient atmosphere.

In the method of the present invention, the primary sintered body is subjected to HIP treatment to obtain a zirconia sintered body.

The HIP treatment is preferably carried out at a temperature of 1,250° C. to less than 1,600° C., and more preferably 1,250° C. to 1,500° C. Below 1,250° C. in the HIP treatment, it is difficult to increase the sintered density of the sintered body. Meanwhile, at a temperature of 1,600° C. or more, the average grain size of the zirconia sintered body significantly exceeds 10 μm, which ensures high translucency but causes low mechanical strength of the zirconia sintered body.

A pressure medium for HIP treatment is not particularly limited, and is, for example, argon gas commonly used. Other gases, for example, nitrogen or oxygen, may also be used.

The HIP treatment is preferably carried out at a pressure of at least 50 MPa, and more preferably 100 MPa to 200 MPa.

The primary sintered body used in the method of the present invention is dense, has a small grain size and its crystal phase is composed of cubic crystals only. Therefore, it is believed that plastic flow during HIP sintering tends to lead to high transparency.

If necessary, the production method of the present invention may further include annealing the zirconia sintered body after HIP treatment. The annealing is preferably carried out by maintaining the zirconia sintered body under normal pressure at a temperature of 1,000° C. to 1,200° C. in air or an oxidative atmosphere using oxygen for at least 1 hr.

EXAMPLES

The present invention will be explained in detail with reference to the following examples, but it should be understood these examples are not intended to limit the present invention.

(Measurement of Average Grain Size)

The average grain sizes of sintered bodies were measured by observing the polished etched surfaces of the sintered bodies under a scanning electron microscope. Specifically, the average grain sizes were calculated by Equation (1) according to the method described in J. Am. Ceram. Soc., 52[8], 443-6 (1969).

$$D = 1.56L \quad (1)$$

D: Average grain size (μm)

L: Average length of particles (μm) traversing an arbitrary straight line

The L value was calculated by averaging 100 or more actually measured lengths.

(In-Line Transmission and Total Forward Transmission)

The in-line transmission and total forward transmission were measured using a double-beam spectrophotometer (V-650, JASCO Corporation). For the preparation of a sample to be measured, the sintered body was processed to a thickness of 1 mm and then both surfaces of the sintered body were polished to have a surface roughness Ra of 0.02 μm or less. The transmission values of the sample were measured in the wavelength range of 200 nm to 800 nm. The transmission values of the sample for visible light at a wavelength of 600 nm were adopted as the in-line transmission and total forward transmission.

Herein, the in-line transmission is a parameter satisfying the following relationship.

$$Ti = Tt - Td \quad (2)$$

Tt: Total forward transmission (%)
Td: Diffuse transmission (%)
Ti: In-line transmission (%)

Since the transmission of the zirconia sintered body of the present invention complies with the Lambert-Beer law, the thicker the sample, the lower the transmission.

(Average Flexural Strength)

A 3-point flexural test was conducted according to "Flexural strength test method of fine ceramics" of JISR1601. An average of ten measure values was adopted as the average flexural strength.

Example 1

A zirconia powder TZ-8Y manufactured by Tosoh Corporation (yttrium oxide=8 mol %, specific surface area=13.5 m$^2$/g) was subjected to compression molding using a uniaxial press (500 kgf/cm$^2$) and a CIP (2 ton/cm$^2$) to obtain a molded body.

The molded body thus obtained was heated at a temperature rise rate of 400° C./hr from room temperature to 1,100° C., at a temperature rise rate of 10° C./hr from 1,100° C. to 1,280° C., and maintained at 1,280° C. for 2 hrs. The total retention time at 1,200° C. or higher was 10 hrs. Thereafter, the molded body was allowed to cool to obtain a primary sintered body (Sample No. 1).

The density of the primary sintered body thus obtained was measured by the Archimedes method and the average grain size of the primary sintered body was determined. The results are shown in Table 1. A texture of the sintered body is shown in FIG. 1. The relative density was calculated from the theoretical density of 5.99 g/cm$^3$.

The primary sintered body (Sample No. 1) was put into an alumina crucible and was subjected to HIP treatment under the following conditions: temperature rise rate=400° C./hr, treatment temperature=1400° C., argon gas pressure=150 MPa, retention time=1 hr. After HIP treatment, the sintered body was annealed at 1,000° C. in air for 1 hr to obtain a zirconia sintered body.

Figure 2:
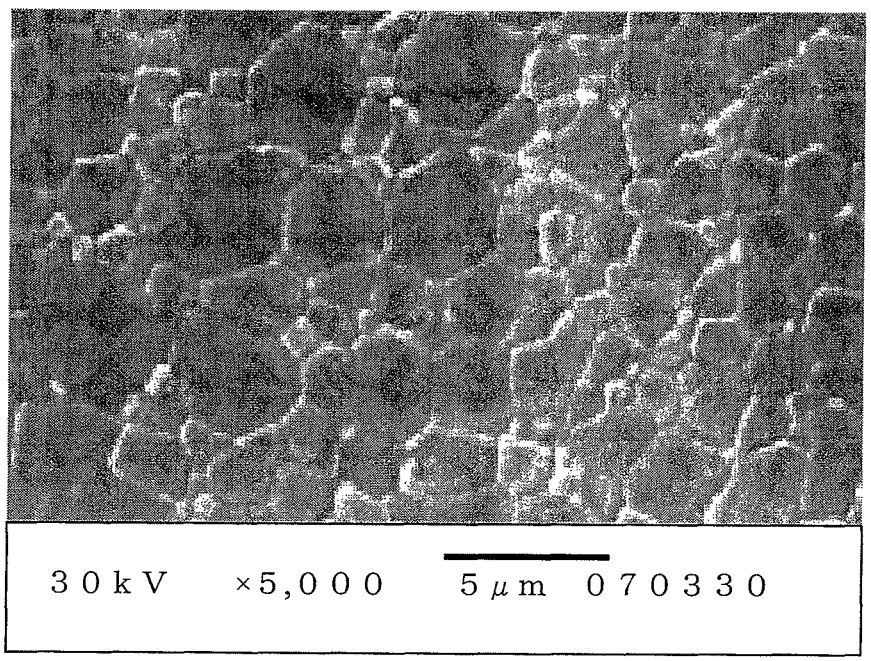
FIG. 2 shows a texture of a zirconia sintered body (Example 1) (scale bar=5 μm).
Figure 3:
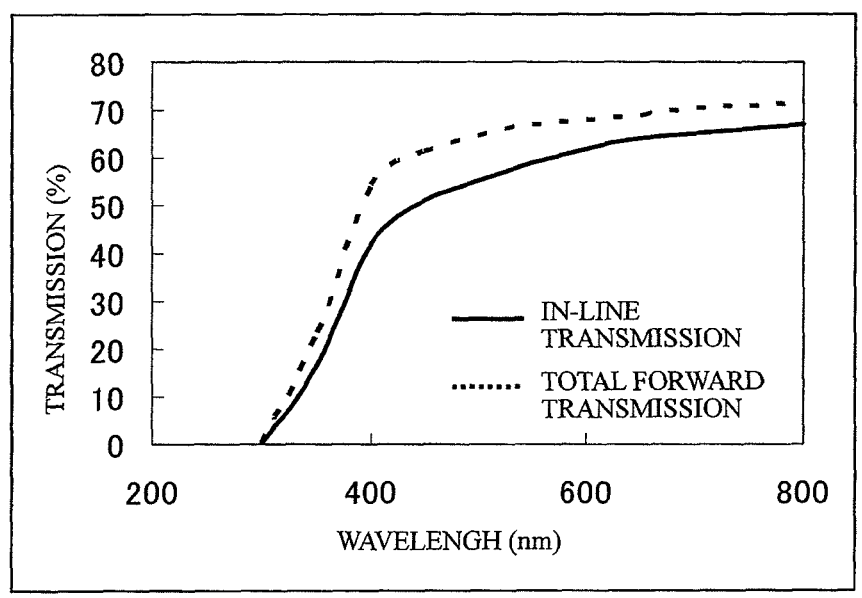
FIG. 3 is a graph showing the dependency of the transmission of a zirconia sintered body (Example 1) on the measured wavelength.

The density, average grain size, in-line transmission (and total forward transmission) and flexural strength of the zirconia sintered body obtained were measured. The results are shown in Table 2. A texture of the zirconia sintered body is shown in FIG. 2.

Example 2

A primary sintered body (sample No. 2) was prepared in the same manner as in Example 1, except that the molded body was heated at a temperature rise rate of 10° C./hr from 1,100° C. to 1,250° C. and maintained at 1,250° C. for 4 hrs. The total retention time at 1,200° C. or higher was 9 hrs. The results are shown in Table 1.

The primary sintered body thus obtained was subjected to HIP treatment under similar conditions to those in Example 1. The results are shown in Table 2.

Example 3

A primary sintered body (sample No. 3) was prepared in the same manner as in Example 1, except that the molded body was heated at a temperature rise rate of 400° C./hr from room temperature to 1,260° C. and maintained at 1,260° C. for 20 hrs. The total retention time at 1,200° C. or higher was 20.2 hrs.

The primary sintered body thus obtained was found to have a density of 5.72 g/cm$^3$ (relative density=95.5%) and an average grain size of 0.6 μm.

The primary sintered body was subjected to HIP treatment under similar conditions to those in Example 1, except that the treatment temperature was changed to 1,500° C., to produce a zirconia sintered body.

The zirconia sintered body thus obtained was found to have a density of 5.99 g/cm$^3$, an average grain size of 5.0 μm, an in-line transmission (and a total forward transmission) of 70% (and 74%), and an average flexural strength of 376 MPa.

Example 4

A primary sintered body (sample No. 4) was prepared in the same manner as in Example 1, except that the molded body was heated at a temperature rise rate of 1,000° C./hr from room temperature to 1,400° C. and was allowed to cool by stopping the heating instead of maintaining the temperature.

The primary sintered body thus obtained was found to have a density of 5.63 g/cm$^3$ (relative density=94.0%) and an average grain size of 0.3 p.m.

The primary sintered body was subjected to HIP treatment under similar conditions to those in Example 1, except that the treatment temperature was changed to 1,300° C., to produce a zirconia sintered body.

The zirconia sintered body thus obtained was found to have a density of 5.99 g/cm$^3$, an average grain size of 0.6 μm, an in-line transmission (and a total forward transmission) of 65% (and 70%), and an average flexural strength of 454 MPa.

Example 5

A primary sintered body (sample No. 6) was prepared in the same manner as in Example 1, except that the molded body was heated at a temperature rise rate of 1,000° C./hr from room temperature to 1,430° C. and was allowed to cool by stopping the heating instead of maintaining the temperature.

The primary sintered body thus obtained was found to have a density of 5.73 g/cm$^3$ (relative density=95.7%) and an average grain size of 0.5 μm.

The primary sintered body was subjected to HIP treatment under similar conditions to those in Example 1, except that the treatment temperature was changed to 1,300° C., to produce a zirconia sintered body.

The zirconia sintered body thus obtained was found to have a density of 5.99 g/cm$^3$, an average grain size of 0.7 μm, an in-line transmission (and a total forward transmission) of 57% (and 64%), and an average flexural strength of 432 MPa.

Comparative Example 1

A primary sintered body (sample No. 5) was prepared in the same manner as in Example 1, except that the molded body was heated at a temperature rise rate of 100° C./hr from 1,100° C. to 1,400° C. and maintained at 1,400° C. for 2 hrs.

The primary sintered body thus obtained was found to have a density of 5.93 g/cm$^3$ (relative density=99.0%) and an average grain size of 4.0 μm.

The primary sintered body thus obtained was subjected to treatment under similar conditions to those in Example 1 to produce a zirconia sintered body.

The zirconia sintered body thus obtained was found to have a density of 5.99 g/cm³, an average grain size of 4.5 μm, an in-line transmission (and a total forward transmission) of 15% (and 55%), and an average flexural strength of 356 MPa.

Although the primary sintered body was subjected to HIP treatment under similar conditions to those in Example, the translucency of the zirconia sintered body was not high, because the primary sintered body had the average grain size of 1 μm or more and the relative density of 98% or more.

Comparative Example 2

The primary sintered body similar to that in Comparative Example 1 was subjected to HIP treatment under similar conditions to those in Patent Document 1 (treatment temperature=1,750° C., pressure=150 MPa and retention time=1 hr). After the HIP treatment, the sintered body was annealed at 1,100° C. in air for 2 hrs to produce a zirconia sintered body.

The zirconia sintered body thus obtained was found to have a density of 5.99 g/cm³, an average grain size of 58 μm, an in-line transmission (and a total forward transmission) of 72% (and 74%), and an average flexural strength of 267 MPa. The translucency was high but the flexural strength thereof was low.

TABLE 1

| | | Primary sintered body | | |
|---|---|---|---|---|
| | No. | Density (g/cm³) | Relative density (%) | Average grain size (μm) |
| Example 1 | No. 1 | 5.79 | 96.7 | 0.4 |
| Example 2 | No. 2 | 5.66 | 94.5 | 0.3 |
| Example 3 | No. 3 | 5.72 | 95.5 | 0.6 |
| Example 4 | No. 4 | 5.63 | 94.0 | 0.3 |
| Example 5 | No. 6 | 5.73 | 95.7 | 0.5 |
| Comparative Examples 1 and 2 | No. 5 | 5.93 | 99.0 | 4.0 |

TABLE 2

| | Primary sintered body No. | HIP treatment | | | | | | Average flexural strength (MPa) |
|---|---|---|---|---|---|---|---|---|
| | | Temp. (° C.) | Pressure (MPa) | Density (g/cm³) | Average grain size (μm) | In-line transmission (%) | Total forward transmission (%) | |
| Example 1 | No. 1 | 1400 | 150 | 5.98 | 3.2 | 62.0 | 68.2 | 370 |
| Example 2 | No. 2 | 1400 | 150 | 5.98 | 3.3 | 62.5 | 68.7 | 398 |
| Example 3 | No. 3 | 1500 | 150 | 5.99 | 5.0 | 70 | 74 | 376 |
| Example 4 | No. 4 | 1300 | 150 | 5.99 | 0.6 | 65 | 70 | 454 |
| Example 5 | No. 6 | 1300 | 150 | 5.99 | 0.7 | 57 | 64 | 432 |
| Comparative Example 1 | No. 5 | 1400 | 150 | 5.99 | 4.5 | 15 | 55 | 356 |
| Comparative Example 2 | No. 5 | 1750 | 150 | 5.99 | 58 | 72 | 74 | 267 |

While the present invention has been described in detail and with reference to specific embodiments thereof, it will be apparent to one skilled in the art that various changes and modifications can be made therein without departing from the spirit and scope thereof.

This application is based on Japanese Patent Application filed on Aug. 7, 2009 (Application No. 2009-184139), the contents thereof being hereby incorporated by reference.

Industrial Applicability

The zirconia sintered body of the present invention is a sintered body which has high mechanical strength and creates an aesthetic feeling, thus being suitable for use in decorative members, jewelry goods, exterior components of premium watches and portable electronic devices, and aesthetic dental materials, such as orthodontic materials. Therefore, the industrial value of the present invention is remarkable.

The invention claimed is:

1. A zirconia sintered body having an average grain size of 8 μm or less and an in-line transmission of 50% or more at a sample thickness of 1 mm for visible light at a measured wavelength of 600 nm, and having a cubic fluorite structure in crystal phase.

2. The zirconia sintered body according to claim 1, which has an average grain size of 5 μm or less.

3. The zirconia sintered body according to claim 1, which has an in-line transmission of 55% or more at a sample thickness of 1 mm for visible light at a measured wavelength of 600 nm.

4. The zirconia sintered body according to claim 1, which has an in-line transmission of 60% or more at a sample thickness of 1 mm for visible light at a measured wavelength of 600 nm.

5. The zirconia sintered body according to claim 1, which comprises 7 mol % to 30 mol % of yttria.

6. The zirconia sintered body according to claim 1, which has an average flexural strength of 300 MPa or more.

7. The zirconia sintered body according to claim 1, which has an average flexural strength of 350 MPa or more.

8. A method for producing a zirconia sintered body of claim 1, comprising molding a zirconia powder to form a zirconia molded body, sintering the zirconia molded body to form a primary sintered body, and subjecting the resultant primary sintered body to hot isostatic pressing treatment, wherein the primary sintered body served for the hot isostatic pressing treatment has an average grain size of 1 μm or less and a relative density of 92% or more and its crystal phase is composed of cubic crystals only.

9. The method according to claim 8, wherein the primary sintered body is maintained at a temperature of 1,200° C. to 1,300° C. for at least 5 hrs.

10. The method according to claim 8, wherein the primary sintered body is prepared by sintering the molded body at a temperature rise rate of 500° C./hr or more and at a sintering temperature of from 1,350 to 1,500° C. without maintaining the molded body at the sintering temperature.

11. The method according to claim 8, wherein the hot isostatic pressing is performed at a temperature of 1,250° C. to less than 1,600° C. and a pressure of at least 50 MPa.

12. The zirconia sintered body according to claim 3, which has an average grain size of 5 μm or less.

* * * * *